US009310571B2

(12) United States Patent
Hung

(10) Patent No.: US 9,310,571 B2
(45) Date of Patent: Apr. 12, 2016

(54) PHOTOELECTRIC CONVERSION DEVICE AND OPTICAL FIBER COUPLING CONNECTOR

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 324 days.

(21) Appl. No.: 13/952,683

(22) Filed: Jul. 29, 2013

(65) Prior Publication Data
US 2014/0185993 A1 Jul. 3, 2014

(30) Foreign Application Priority Data
Dec. 27, 2012 (TW) .............................. 101150335 A

(51) Int. Cl.
 G02B 6/43 (2006.01)
 G02B 6/42 (2006.01)
 G02B 6/38 (2006.01)

(52) U.S. Cl.
 CPC ............ *G02B 6/4214* (2013.01); *G02B 6/3897* (2013.01); *G02B 6/425* (2013.01); *G02B 6/4292* (2013.01)

(58) Field of Classification Search
 CPC ............................. G02B 6/3897; G02B 6/4214
 USPC ................................. 385/49, 88–94
 See application file for complete search history.

(56) References Cited

U.S. PATENT DOCUMENTS

| 6,454,470 | B1 * | 9/2002 | Dwarkin | G02B 6/4214 385/31 |
| 6,491,447 | B2 * | 12/2002 | Aihara | G02B 6/4214 385/89 |
| 6,947,671 | B2 * | 9/2005 | Sekiya | G02B 6/32 359/489.09 |
| 8,079,125 | B2 * | 12/2011 | Ban | G02B 6/4206 29/407.09 |
| 2008/0232737 | A1 * | 9/2008 | Ishigami | G02B 6/4201 385/14 |

* cited by examiner

*Primary Examiner* — Daniel Petkovsek
(74) *Attorney, Agent, or Firm* — Novak Druce Connolly Bove + Quigg LLP

(57) ABSTRACT

A photoelectric conversion device includes a circuit board, light emitting modules, light receiving modules, and an optical coupling lens. The light emitting modules and the light receiving modules are mounted on the circuit board. The optical coupling lens is mounted on the circuit board and includes a first mounting surface. The first mounting surface defines a first recess at a central portion thereof and four receiving grooves at four peripheral edges thereof apart from the first recess. The receiving grooves are exposed to the peripheral edges of the first mounting surface.

15 Claims, 6 Drawing Sheets

PHOTOELECTRIC CONVERSION DEVICE AND OPTICAL FIBER COUPLING CONNECTOR

BACKGROUND

1. Technical Field

The present disclosure relates to communication technologies and, particularly, to a photoelectric conversion device and an optical fiber coupling connector.

2. Description of Related Art

An optical fiber coupling connector includes a photoelectric conversion device and a number of optical fibers. The photoelectric conversion device includes a circuit board, a number of light emitting modules, a number of light receiving modules, and an optical coupling lens part. The light emitting modules and the light receiving modules are mounted on the circuit board. The optical fibers correspond to and are optically coupled with the light emitting modules and the light receiving modules one-to-one through the optical coupling lens part. The optical coupling lens part includes a number of first converging portions and a number of second converging portions corresponding to the first converging portions. The optical coupling lens is fixedly mounted on the circuit board. The first converging portions are aligned with the light emitting modules and the light receiving modules. The second converging portions are aligned with the optical fibers.

The optical coupling lens part is fixed on the circuit board via dispensing glue at joint between sidewalls of the optical coupling lens part and the circuit board. On the one hand, the glue occupies much extra space of the circuit board. On the other hand, the optical coupling lens part is easily shifted or dropped from the circuit board when in transit because the contact area between the optical coupling lens part and the circuit board is limited.

Therefore, it is desirable to provide a photoelectric conversion device and an optical fiber coupling connector having the photoelectric conversion device, which can overcome or alleviate the above-mentioned problems.

DETAILED DESCRIPTION

Figure 1:
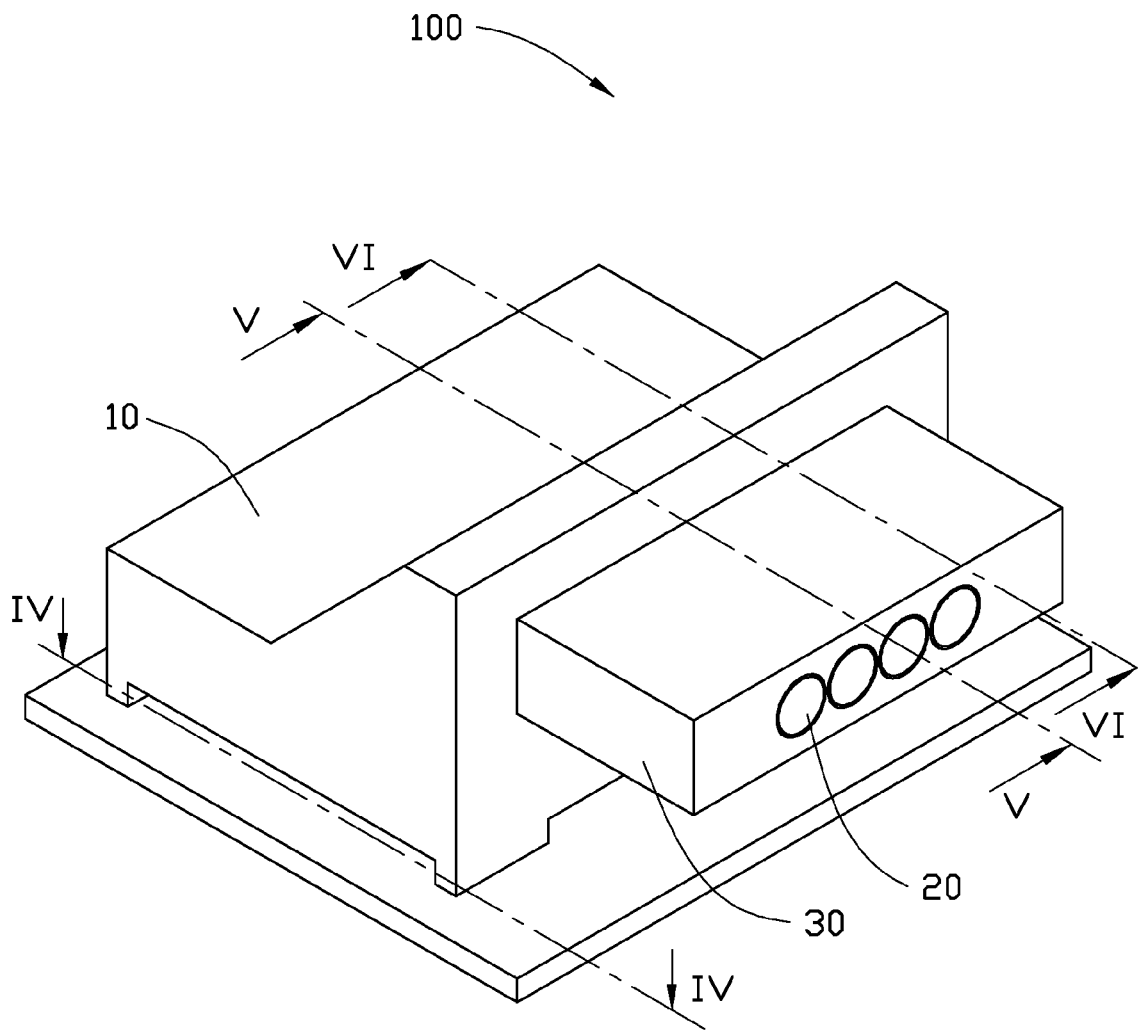
FIG. 1 is a schematic, isometric view of an optical fiber coupling connector, according to an exemplary embodiment.

FIG. 1 shows an optical fiber coupling connector 100 according to an exemplary embodiment. The optical fiber coupling connector 100 includes a photoelectric conversion device 10, four optical fibers 20, and a body 30.

Figure 2:
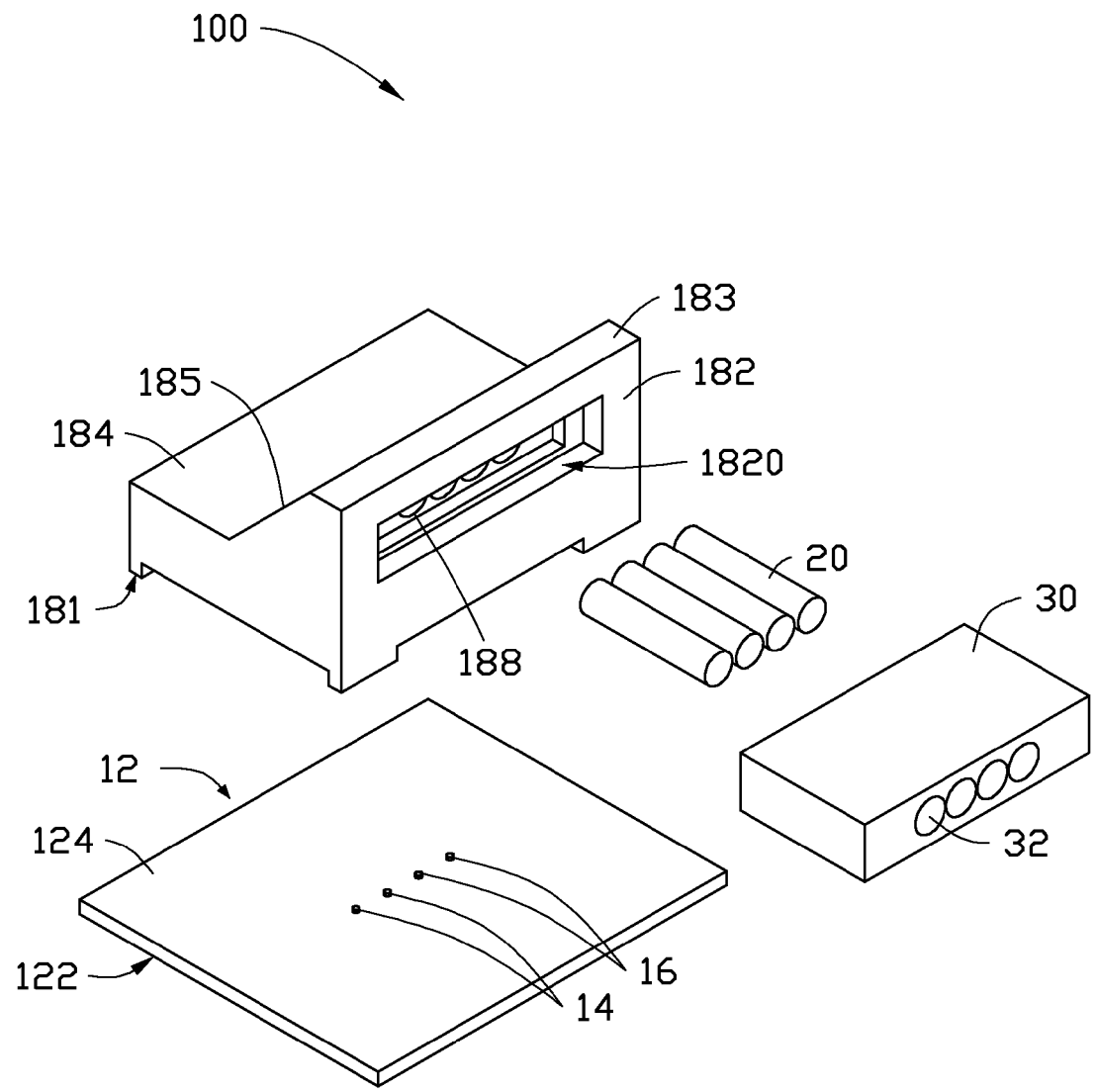
FIG. 2 is an exploded view of the optical fiber coupling connector of FIG. 1.
Figure 3:
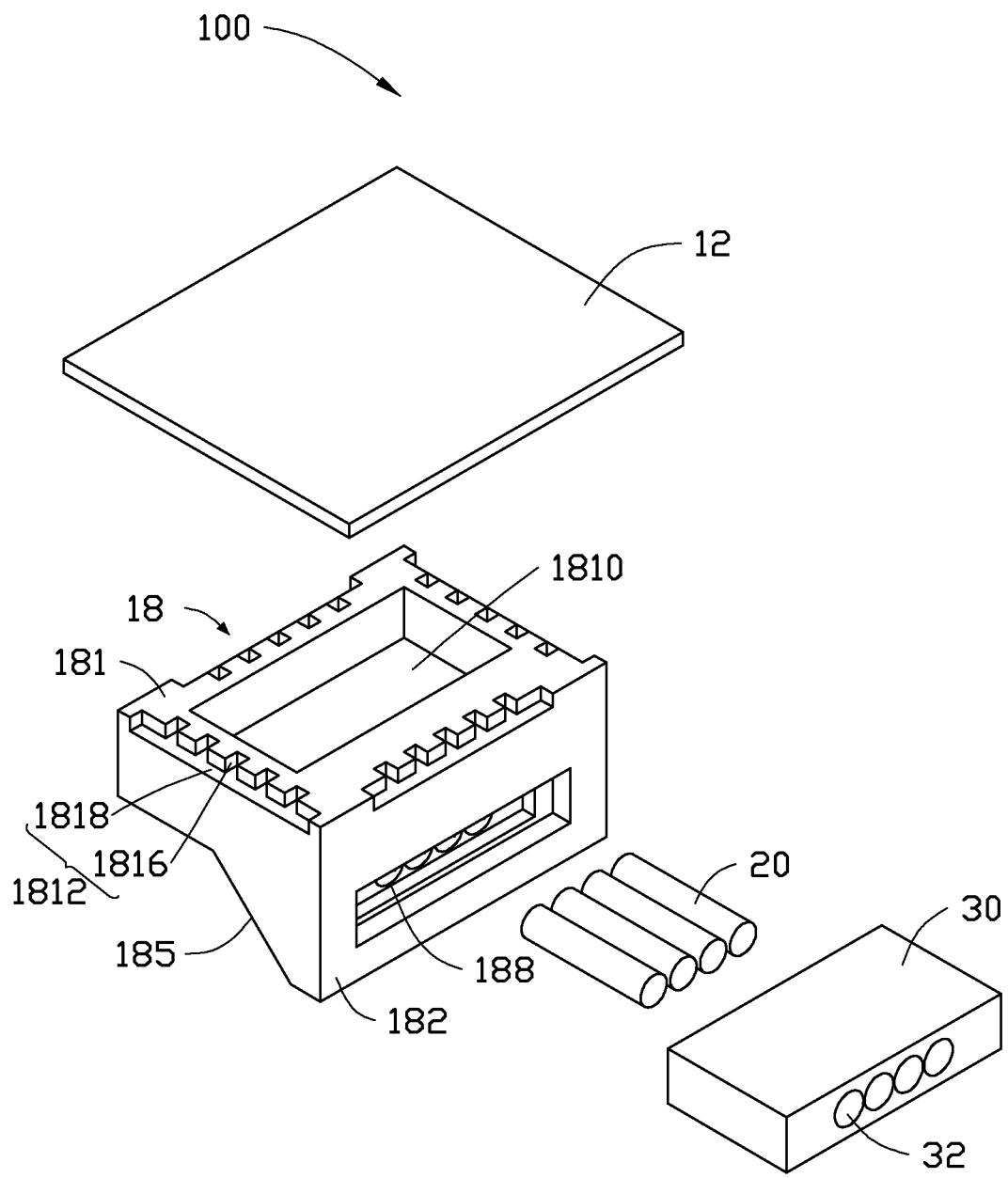
FIG. 3 is similar to FIG. 2, but viewed from another angle.
Figure 4:
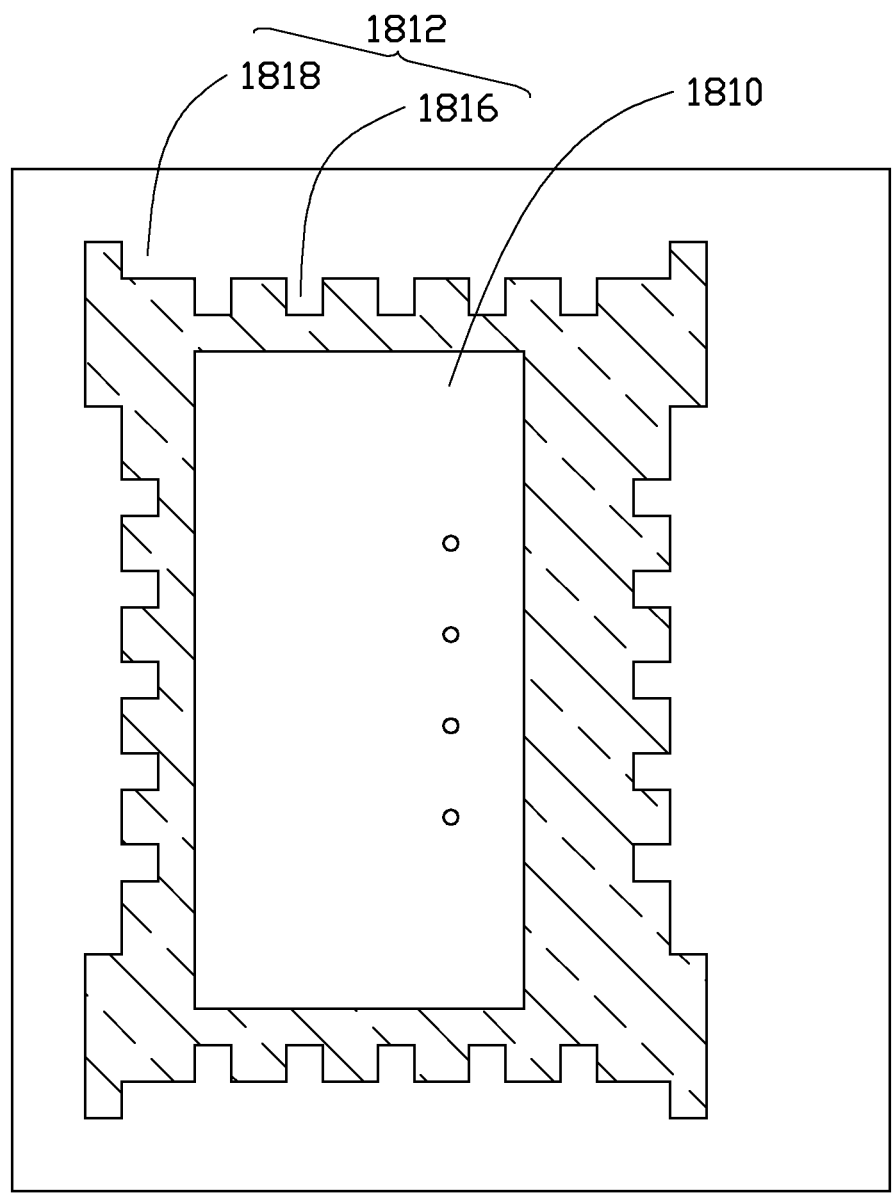
FIG. 4 is a cross-sectional view of the optical fiber coupling connector of FIG. 1, taken along the line IV-IV of FIG. 1.

FIGS. 2-3 show that the photoelectric conversion device 10 includes a circuit board 12, two light emitting modules 14, two light receiving modules 16, and an optical coupling lens part 18.

The circuit board 12 includes a first surface 122 and a second surface 124. The first surface 122 and the second surface 124 are positioned at opposite sides of the circuit board 12, and the first surface 122 is substantially parallel to the second surface 124.

The two light emitting modules 14 and the two light receiving modules 16 are mounted on the second surface 124 and are electrically connected to the circuit board 12. In detail, the light emitting modules 14 and the light receiving modules 16 are arranged in a straight line and are spaced from each other. That is, the centers of the light emitting modules 14 and the centers of the light receiving modules 16 are arranged in a straight line. In this embodiment, each of the light emitting modules 14 is a vertical cavity surface emitting laser (VCSEL) diode and is configured for converting electric signals to optical signals and emitting light beams. Each of the light receiving modules 16 is a photo diode and is configured for receiving light beams and converting optical signals to electric signals.

FIGS. 2-5 show that the optical coupling lens part 18 includes a first mounting surface 181, a second mounting surface 182, a first upper surface 183, a second upper surface 184, a reflection surface 185, four first converging portions 186, and four second converging portions 188.

The first mounting surface 181 is substantially perpendicularly connected to the second mounting surface 182. The first upper surface 183 is substantially perpendicularly connected to the second mounting surface 182, and the first upper surface 183 and the first mounting surface 181 are positioned at opposite sides of the optical coupling lens part 18. The second upper surface 184 and the first mounting surface 181 are positioned at opposite sides of the optical coupling lens part 18, and the second upper surface 184 is substantially parallel to the first mounting surface 181. The second upper surface 184 is lower than the first upper surface 183. That is, the second upper surface 184 is located between the first upper surface 183 and the first mounting surface 181. The reflection surface 185 is obliquely interconnected between the first upper surface 183 and the second upper surface 184. An included angle between the reflection surface 185 and the first upper surface 183 is about 45 degrees, and an included angle between the reflection surface 185 and the second upper surface 184 is about 45 degrees.

The first mounting surface 181 defines a first recess 1810 at a central portion of the first mounting surface 181 and four receiving grooves 1812 at four peripheral edges of the first mounting surface 181. The four receiving grooves 1812 surround the first recess 1810 and are spaced from the first recess 1810. The optical coupling lens part 18 includes a first optical surface 1814 at an upper part of the first recess 1810. The first optical surface 1814 is substantially parallel to the first mounting surface 181. That is, an included between a main plane of the first optical surface 1814 and a main plane of the reflection surface 185 is about 45 degrees. Each of the receiving grooves 1812 is exposed to the corresponding peripheral edge. In other words, a side of each of the receiving grooves 1812 is open, and the opening side is away from the first recess 1810. Each of the receiving grooves 1812 includes five first receiving portions 1816 and a second receiving portion 1818 perpendicular to the first receiving portions 1816. The five first receiving portions 1816 are spaced from each other and are arranged in a saw-toothed line along each of the peripheral edges. The second receiving portion 1818 is elongated and is in communication with the five first receiving portions 1816. The five first receiving portions 1816 and the second receiving portion 1818 are arranged in that order along a direction from the first recess 1810 to the corresponding peripheral edge. That is, the five first receiving portions 1816 are nearer to the first recess 1810 than the second receiving portion 1818. In this embodiment, the first recess 1810 is rectangular. Each of the first receiving portions 1816 is rectangular, and the second receiving portion 1818 is rectangular.

In other embodiments, the first recess 1810 may be triangular, circular, regular or irregular shaped. Each of the first receiving portions 1816 may be triangular, circular, and regular, or irregular shaped, and the second receiving portion 1818 may be triangular, circular, regular, or irregular shaped. The number of the first receiving portions 1816 is not limited to five, and may be two and more than two.

The second mounting surface 182 defines a second recess 1820 at a central portion thereof.

The second recess 1820 is a stepped recess. The second recess 1820 includes a first receiving cavity 1822 and a second receiving cavity 1824. The first receiving cavity 1822 and the second receiving cavity 1824 are in communication with each other and are arranged in that order from the reflection surface 185 to the second mounting surface 182. The optical coupling lens part 18 includes a second optical surface 1826 at a left part of the first receiving cavity 1822 and a blocking surface 1828 at a left part of the second receiving cavity 1824. The second optical surface 1826 is substantially parallel to the second mounting surface 182. That is, an included angle between a main plane of the second optical surface 1826 and a main plane of the reflection surface 185 is about 45 degrees. The blocking surface 1828 is substantially parallel to the second mounting surface 182. In this embodiment, each of the first receiving cavity 1822 and the second receiving cavity 1824 is rectangular, and the width and the length of the second receiving cavity 1824 are larger than the width and the length of the first receiving cavity 1822.

The four first converging portions 186 are formed on the first optical surface 1814 and are arranged apart from each other. In detail, the first converging portions 186 are arranged in a straight line, which is parallel to the reflection surface 185, and correspond to the light emitting modules 14 and the light receiving modules 16 one-to-one. In this embodiment, each of the first converging portions 186 is a convex lens.

The four second converging portions 188 are formed on the second optical surface 1826 and received in the first receiving cavity 1822. In detail, the second converging portions 188 are arranged in a straight line, which is substantially parallel to the reflection surface 185, and correspond to the first converging portions 186 one-to-one. In this embodiment, each of the second converging portions 188 is a convex lens.

The body 30 is substantially a cuboid and defines four receiving holes 32 conforming to the respective optical fibers 20. The body 30 is inserted in the second receiving cavity 1824 and abuts against the blocking surface 1828. The body 30 does not contact the second converging portions 188. The four optical fibers 20 are received in the respective receiving holes 32 and aligned with the four second converging portions 188, respectively.

When the photoelectric conversion device 10 is assembled, first, the optical coupling lens part 18 is supported on the second surface 124 of the circuit board 12. In this situation, the light emitting modules 14 and the second light receiving modules 16 are received in the first recess 1810 and are aligned with the first converging portions 186. Second, the optical coupling lens part 18 is adhered to the second surface 124 by glue so that the optical coupling lens part 18 is mounted on the second surface 124. In detail, glue is dropped at the four peripheral edges of the first mounting surface 181. The glue fills in the whole receiving grooves 1812 including the first receiving portions 1814 and the second receiving portions 1816. Third, the glue is solidified by ultraviolet radiations. On the one hand, the glue is located between the optical coupling lens part 18 and the circuit board 12 and does not occupy any extra space of the circuit board 12. On the other hand, the contact area between the optical coupling lens part 18 and the circuit board 12 increases because of the receiving grooves 1812. Therefore, the optical coupling lens part 18 can be fixed more firmly to the circuit board 12.

Figure 5:
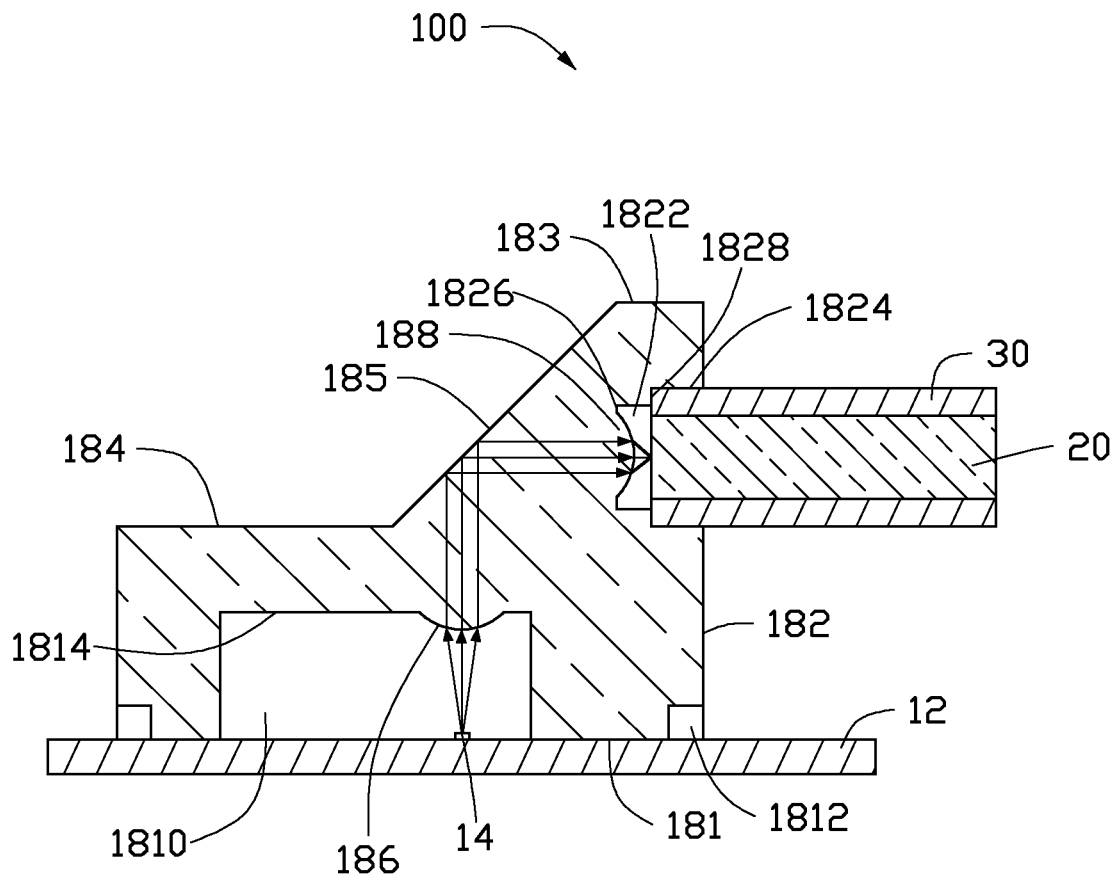
FIG. 5 is a cross-sectional view of the optical fiber coupling connector of FIG. 1, taken along the line V-V of FIG. 1.

Referring to FIG. 5, when the optical fiber coupling connector 100 is in use, electrical power is applied to the light emitting modules 14 and the light receiving modules 16 through the circuit board 12. Thus, light beams emitting from each of the light emitting modules 14 pass through the corresponding first converging portion 186 and become parallel light beams. The parallel light beams are reflected by the reflection surface 185 toward the corresponding second converging lens 188, and are finally converged into the corresponding optical fiber 20.

Figure 6:
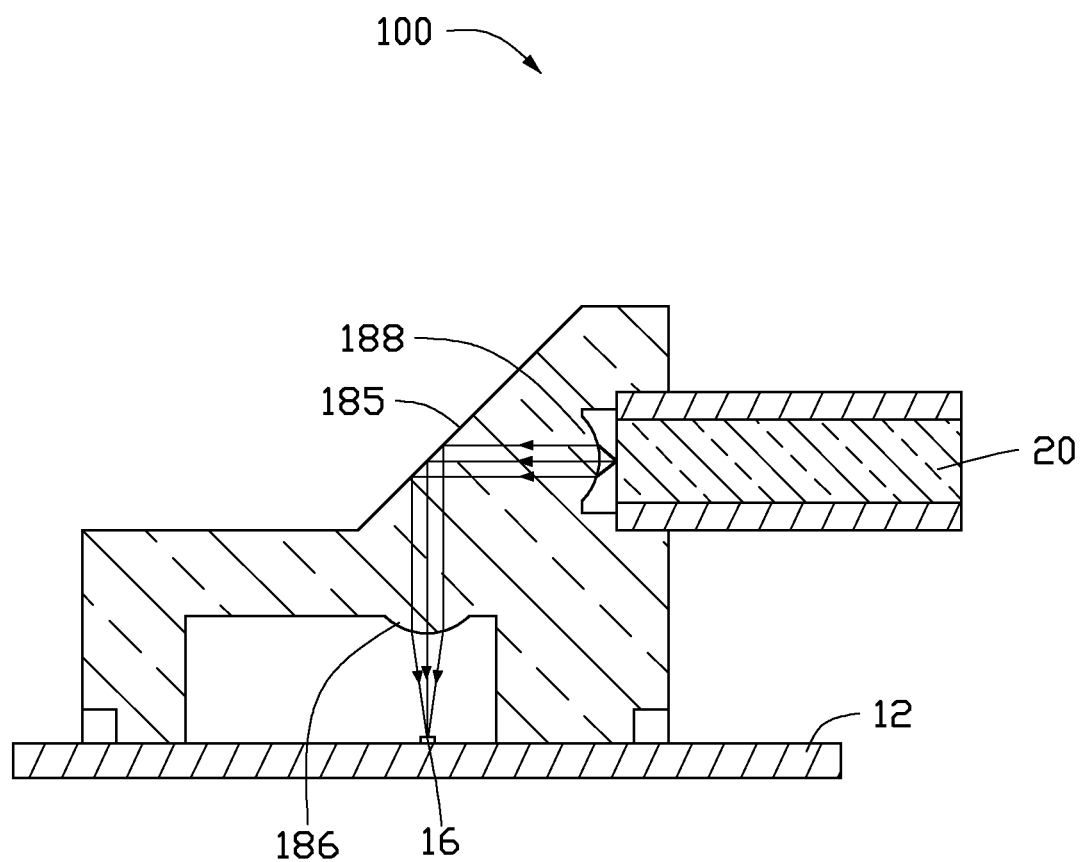
FIG. 6 is a cross-sectional view of the optical fiber coupling connector of FIG. 1, taken along the line VI-VI of FIG. 1.

Accordingly, referring to FIG. 6, light beams from each of the optical fibers 20 become parallel light beams after passing through the corresponding second converging lens 188. The parallel light beams are reflected by the reflection surface 185 toward the corresponding first converging portion 186, and are finally converged into the corresponding light receiving module 16.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A photoelectric conversion device comprising:
   a circuit board;
   a plurality of light emitting modules mounted on the circuit board;
   a plurality of light receiving modules mounted on the circuit board and being apart from the light emitting modules; and
   an optical coupling lens part mounted on the circuit board and comprising a first mounting surface, a second mounting surface perpendicularly connected to the first mounting surface, a reflection surface oblique relative to the first mounting surface and the second mounting surface, a plurality of first converging lenses, and a plurality of second converging lenses, the first mounting surface defining a first recess, the first recess having a first optical surface at the upper part thereof, the first mounting surface having a plurality of peripheral edges, each of the peripheral edges of the first mounting surface defining a receiving groove being apart from the first recess, the receiving grooves extending along the respective peripheral edges of the first mounting surface, the second mounting surface defining a second recess, the second recess having a second optical surface at the left part thereof, the first converging lenses formed on the first optical surface, the second converging lenses formed on the second optical surface corresponding to the first converging lenses, the optical coupling lens part mounted on the circuit board, the first converging lenses aligned with the light emitting modules and the light receiving modules, the reflection surface configured for reflecting light beams from each of the first converging lenses toward the corresponding second converging lens and reflecting light beams from each of the second converging lenses toward the corresponding first converging lens, wherein each of the receiving grooves comprises a plurality of first receiving portions and a second receiving portion perpendicular to each of the first receiving portions, the first receiving portions are spaced from each other, the second receiving portion communicates with the first receiving portions, and the first receiving portions are nearer to the first recess than to the second receiving portion.

2. The photoelectric conversion device as claimed in claim 1, wherein the second receiving portion is elongated, and the first receiving portions and the first recess are rectangular.

3. The photoelectric conversion device as claimed in claim 1, wherein the second recess is a stepped recess and comprises a first receiving cavity and a second receiving cavity, the first receiving cavity communicates with the second receiving cavity, each of the first receiving cavity and the second receiving cavity is rectangular, and the width and the length of the second receiving cavity is larger than those of the first receiving cavity.

4. The photoelectric conversion device as claimed in claim 3, wherein the optical coupling lens part further comprises a first upper surface and a second upper surface both parallel to and opposite to the first mounting surface, the first upper surface is connected to the second mounting surface, and the reflection surface is obliquely interconnected between the first upper surface and the second upper surface.

5. The photoelectric conversion device as claimed in claim 4, wherein the first converging portions are arranged in a straight line, and the second converging portions are arranged in a straight line.

6. The photoelectric conversion device as claimed in claim 5, wherein each of first converging portions is convex lens, and each of the second converging lenses is convex lens.

7. The photoelectric conversion device as claimed in claim 1, wherein an included angle between a main plane of the first optical surface and a main plane of the reflection surface is about 45 degrees, and an included angle between a main plane of the second optical surface and a main plane of the reflection surface.

8. An optical fiber coupling connector comprising:
a photoelectric conversion device comprising:
a circuit board;
a plurality of light emitting modules mounted on the circuit board;
a plurality of light receiving modules mounted on the circuit board and being apart from the light emitting modules; and
an optical coupling lens part mounted on the circuit board and comprising a first mounting surface, a second mounting surface perpendicularly connected to the first mounting surface, a reflection surface oblique relative to the first mounting surface and the second mounting surface, a plurality of first converging lenses, and a plurality of second converging lenses, the first mounting surface defining a first recess, the first recess having a first optical surface at the upper part thereof, the first mounting surface having a plurality of peripheral edges, each peripheral edge of the first mounting surface defining a receiving groove being apart from the first recess, the receiving grooves extending along the respective peripheral edges of the first mounting surface, the second mounting surface defining a second recess, the second recess having a second optical surface at the left part thereof, the first converging lenses formed on the first optical surface, the second converging lenses formed on the second optical surface corresponding to the first converging lenses, the optical coupling lens part mounted on the circuit board, the first converging lenses aligned with the light emitting modules and the light receiving modules, the reflection surface configured for reflecting light beams from each of the first converging lenses toward the corresponding second converging lens and reflecting light beams from each of the second converging lenses toward the corresponding first converging lens, wherein each of the receiving grooves comprises a plurality of first receiving portions and a second receiving portion perpendicular to each of the first receiving portions, the first receiving portions are s aced from each other the second receiving portion communicates with the first receiving portions, and the first receiving portions are nearer to the first recess than to the second receiving portion; and
a plurality of optical fibers aligned with the respective second converging portions.

9. The optical fiber coupling connector as claimed in claim 8, wherein the second receiving portion is elongated, and the first receiving portions and the first recess are rectangular.

10. The optical fiber coupling connector as claimed in claim 8, wherein the second recess is a stepped recess and comprises a first receiving cavity and a second receiving cavity, the first receiving cavity communicates with the second receiving cavity, each of the first receiving cavity and the second receiving cavity is rectangular, and the width and the length of the second receiving cavity is larger than those of the first receiving cavity.

11. The optical fiber coupling connector as claimed in claim 10, wherein the optical coupling lens part further comprises a first upper surface and a second upper surface both parallel to and opposite to the first mounting surface, the first upper surface is connected to the second mounting surface, and the reflection surface is obliquely interconnected between the first upper surface and the second upper surface.

12. The optical fiber coupling connector as claimed in claim 11, wherein the first converging portions are arranged in a straight line, and the second converging portions are arranged in a straight line.

13. The optical fiber coupling connector as claimed in claim 12, wherein each of first converging portions is convex lens, and each of the second converging lenses is convex lens.

14. The optical fiber coupling connector as claimed in claim 8, wherein an included angle between a main plane of the first optical surface and a main plane of the reflection surface is about 45 degrees, and an included angle between a main plane of the second optical surface and a main plane of the reflection surface.

15. The optical fiber coupling connector as claimed in claim 8, further comprises a body, the body defines a plurality of receiving holes, the optical fibers are received in the respective receiving holes, and the body is inserted in the second recess.

* * * * *